US009764607B2

(12) United States Patent
Uh et al.

(10) Patent No.: US 9,764,607 B2
(45) Date of Patent: Sep. 19, 2017

(54) SENSORING ATTACHING DIVIDE FOR TIRE PRESSURE MONITORING SYSTEM

(71) Applicant: Seetron Inc., Bucheon-Si (KR)

(72) Inventors: Sung Sun Uh, Goyang (KR); Byoum Youn Cho, Bucheon-Si (KR); Jin Soo Kim, Bucheon-Si (KR)

(73) Assignee: Seetron Inc., Bucheon-Si (KR)

( * ) Notice: Subject to any disclaimer, the term of this patent is extended or adjusted under 35 U.S.C. 154(b) by 14 days.

(21) Appl. No.: 15/138,699

(22) Filed: Apr. 26, 2016

(65) Prior Publication Data

US 2016/0311275 A1    Oct. 27, 2016

(51) Int. Cl.
*G01D 11/24*     (2006.01)
*B60C 23/04*     (2006.01)

(52) U.S. Cl.
CPC ................ *B60C 23/0498* (2013.01)

(58) Field of Classification Search
CPC .................................. B60C 23/0498
USPC ........................................ 340/445
See application file for complete search history.

(56) References Cited

U.S. PATENT DOCUMENTS

| | | | | |
|---|---|---|---|---|
| 6,809,700 B2* | 10/2004 | Benedict | ............ | B60C 23/0433 343/866 |
| 7,019,711 B2* | 3/2006 | Johnson | ............. | B60C 23/0493 340/447 |
| 7,104,298 B2* | 9/2006 | Starinshak | ........... | H01Q 1/2241 152/152.1 |
| 7,909,080 B2* | 3/2011 | Weaver | ............... | B60C 23/0408 156/126 |
| 2003/0038716 A1* | 2/2003 | Piesinger | ............ | B60C 23/0408 340/445 |
| 2007/0227644 A1* | 10/2007 | Fagot-Revurat | .... | B60C 23/0452 156/110.1 |
| 2007/0247294 A1* | 10/2007 | Baader | ................ | B60C 23/0408 340/445 |
| 2014/0007666 A1* | 1/2014 | Kutzscher | ........... | B60C 23/0498 73/146.5 |
| 2016/0129738 A1* | 5/2016 | Luce | ...................... | B60C 23/20 73/756 |

FOREIGN PATENT DOCUMENTS

| CA | 2666126 A1 * | 9/2010 | ......... B60C 23/0408 |
|---|---|---|---|
| FR | EP 2392480 A1 * | 12/2011 | ......... B60C 23/0498 |

(Continued)

*Primary Examiner* — Harshad R Patel
*Assistant Examiner* — Jamel Williams
(74) *Attorney, Agent, or Firm* — Dinsmore & Shohl LLP

(57) ABSTRACT

Disclosed is a device for attaching a sensor for a TPMS. The device for attaching a sensor for a TPMS includes: a module housing including a sensor module for a TPMS; a binding unit including a wire that is long enough to be wrapped on a wheel circumference portion of a vehicle and a rotation shaft installed in the module housing to wind or unwind the wire by a normal/reverse rotation; an engaging and fixing unit including an engaged groove and an engaged protrusion formed to generate an engaging and contacting force while being able to control an unwinding rotation corresponding to the rotation shaft of the binding unit; and a rotation unit disposed to rotate the rotation shaft of the binding unit and formed to release an engaging and contacting state of the engaging and fixing unit in connection with the rotating.

18 Claims, 8 Drawing Sheets

(56) References Cited

FOREIGN PATENT DOCUMENTS

| GB | 2426061 A | * | 11/2006 | ......... B60C 23/0408 |
|----|-----------|---|---------|------------------------|
| JP | CA 2490328 A1 | * | 12/2003 | ............ B60C 19/00 |
| KR | 101198924 |   | 11/2012 | |
| WO | WO 2013152294 A1 | * | 10/2013 | ........... B60C 23/045 |

* cited by examiner

SENSORING ATTACHING DIVIDE FOR TIRE PRESSURE MONITORING SYSTEM

CROSS-REFERENCE TO RELATED APPLICATIONS

This application claims priority to and the benefit of Korean Patent Application No. 10-2015-0060691 filed in the Korean Intellectual Property Office on Apr. 29, 2015, the entire contents of which are incorporated herein by reference.

BACKGROUND OF THE INVENTION (a) Field of the Invention

The present invention relates to a device for attaching a sensor for a tire pressure monitoring system (TPMS).

(b) Description of the Related Art

A tire of a vehicle functions to sustain the vehicle body to be able to travel while directly touching a road surface, and transmit a driving force and a braking force to the road surface, and when aiming at realizing these functions to be natural, it is particularly important to maintain an appropriate air pressure of the tire.

The air pressure of the tire may be easily changed depending on a driving environment or condition so it is desirable to frequently check the air pressure in order to secure driving stability of the vehicle, and a safety device of the vehicle for providing a function answering thereto is a tire pressure monitoring system (TPMS).

The tire pressure monitoring system has many types, most of which are formed to have a configuration in which a sensor is attached inside a tire (wheel) of the vehicle, a signal from the sensor is received by a receiver, an air pressure state of the tire is displayed to a dashboard, etc.

In order to secure operational stability of the tire pressure monitoring system, it is particularly important to install the sensor in the tire wheel in a stably fixed and attached state, and regarding methods for installing the sensor, a method for installing the same on one side (rim portion) of the wheel in a fixed manner by use of a screw fastening scheme or a method for fixing the same by winding the wheel with a metal band are known.

Such a tire pressure monitoring system is provided by a Korean patent with the number 10-1198924.

However, the patent of number 10-1198924 provides the configuration in which a sensor module is attached and fixed, while connected to an end of an air tab, to the wheel, so it has drawbacks described below.

Particularly, it is difficult to secure sufficient attachment safety in correspondence to a centrifugal force, huge impacts, or vibrations occurring when the vehicle travels too fast or it runs on an irregular road surface.

When a sensing module is installed while connected to the air tab, and the tire is attached to or detached from the wheel, the sensing module may be easily damaged by contact with an attaching/detaching device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device for attaching a sensor for a TPMS for easily installing the sensor for a TPMS and securing further improved installation stability.

An exemplary embodiment of the present invention provides a device for attaching a sensor for a TPMS, including: a module housing including a sensor module for a TPMS; a binding unit including a wire that is long enough to be wrapped on a wheel circumference portion of a vehicle, and a rotation shaft installed in the module housing to wind or unwind the wire by a normal/reverse rotation; an engaging and fixing unit including an engaged groove and an engaged protrusion formed to generate an engaging and contacting force while being able to control an unwinding rotation corresponding to the rotation shaft of the binding unit; and a rotation unit disposed to rotate the rotation shaft of the binding unit and formed to release an engaging and contacting state of the engaging and fixing unit in connection with the rotating.

The present invention represents a binding and fixing method for winding the wheel circumference portion (e.g., a rim well) of a vehicle with a wire by use of a binding unit provided to the module housing, and it may allow easy and quick installation (or separation) of the module housing (sensor module) to/from the wheel in appropriate cooperation with an operation of the TPMS.

The binding and fixing method using a wire may, for example, secure a further stable fixation compared to the general fixing methods by combination of screws.

Therefore, the present invention may further increase the stability of installing the sensor module for a TPMS and may also acquire sufficient operation and convenience for installation or maintenance.

DETAILED DESCRIPTION OF THE EMBODIMENTS

An embodiment of the present invention will hereinafter be described in detail with reference to the accompanying drawings.

Exemplary embodiments of the present invention will be described in a range implementable by those skilled in the art.

Therefore, the exemplary embodiments of the present invention are modifiable in various other forms so the claims of the present invention are not limited by the exemplary embodiments to be described.

Figure 1:
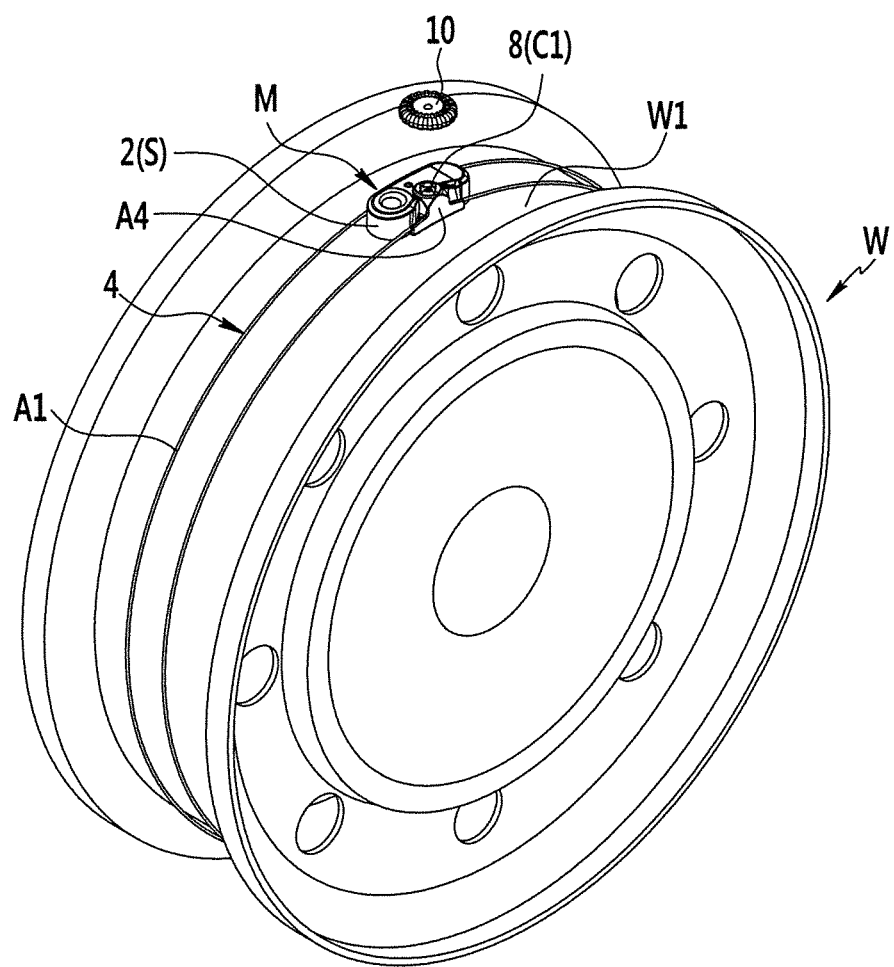
FIG. 1 and FIG. 2 show an entire configuration of a device for attaching a sensor for a TPMS according to an exemplary embodiment of the present invention.
Figure 2:
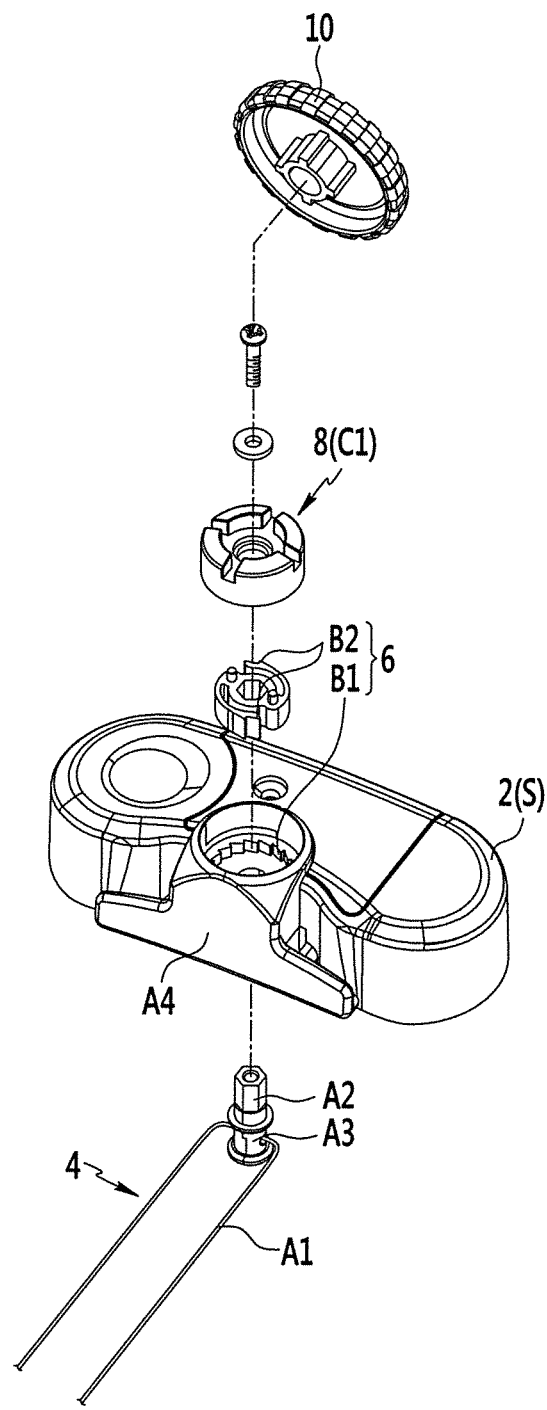

FIG. 1 and FIG. 2 show an entire configuration of a device for attaching a sensor for a tire pressure monitoring system (TPMS) according to an exemplary embodiment of the present invention, and FIG. 3 to FIG. 8 show drawings for describing a detailed configuration and operation thereof, wherein a reference numeral M indicates an attaching device, and a reference numeral W represents a vehicle wheel in which the attaching device (M) is to be installed.

Particularly, the attaching device (M) is formed to have a configuration in which a sensor module (S) for a TPMS (a sensor module hereinafter) may be attached and installed in a wheel (W) according to a binding and fixing method using a wire.

Figure 3:
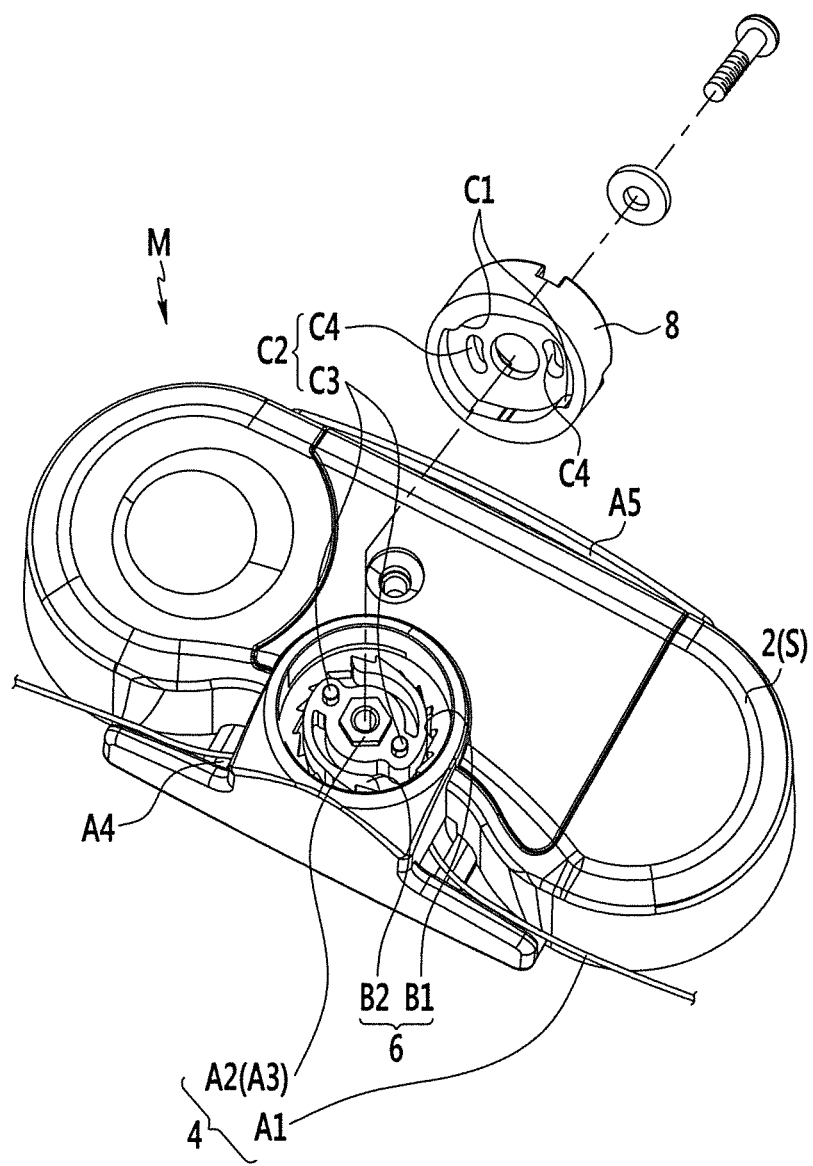
FIG. 3 to FIG. 8 show a detailed configuration and an operation of a device for attaching a sensor for a TPMS according to an exemplary embodiment of the present invention.

Referring to FIG. 1 to FIG. 3, the attaching device (M) includes a module housing 2 on which the sensor module (S) is disposed, and a binding unit 4, an engaging and fixing unit 6, and a rotation unit 8 for attaching and fixing the module housing 2.

The module housing 2 includes the sensor module (S) on an inside thereof, and is provided in a housing form with a size and a shape for allowing a bottom side to be securely adhered to the circumference portion W1 of the wheel (W).

The sensor module (S) may use a module in accordance with a sensing function (e.g., a tire air pressure and a temperature) of the conventional TPMS.

The module housing 2 may be formed according to a conventional injection molding process by using a synthetic resin material with excellent durability.

The binding unit 4 includes a wire A1 and a rotation shaft A2 to which the wire A1 is connected to be wound or unwound.

The wire A1 is exemplarily formed to be long enough to wind around a circumference of a rim well unit at least once from among a circumference portion W1 of the wheel (W), and desirably, when it is long enough to wind it at least twice, binding stability may be further increased when it is installed while winding around the circumference of the rim well unit.

Although not shown in the drawing, the wire Al may be formed with its external side coated so as to control generation of corrosion thereon, and reduce damage (e.g., a scratch) on the surface of the wheel (W) caused by a contact when it is wound on the wheel (W).

As shown in FIG. 2, the rotation shaft A2 includes a bobbin A3, and for example, respective ends of one strand of the wire A1 may be fixed to the bobbin A3 and ends (free ends) may be formed to be connected to each other to be wound or unwound while the ends form two strands connected to each other.

For example, a fastener such as a set screw may be fastened to the bobbin A3, and one end of the wire A1 may be connected and fixed by a pressurizing and contacting force of the fastener.

The rotation shaft A2 is installed in the module housing 2 while it may be available for a normal/reverse rotation operation with respect to an axis line.

For example, as shown in FIG. 2, the rotation shaft A2 may be installed inside the module housing 2 while the bobbin A3 is provided to stand toward a lower side.

The wire A1 connected to the rotation shaft A2 may be set to draw out through a drawing out unit A4 formed at one side of a circumference portion of the module housing 2, and an end (free end) may be set to be engaged to a support unit A5 formed on the opposite side of the drawing out unit A4 and be bound while facing the circumference portion W1 of the wheel (W).

According to the configuration of the binding unit 4, in the case of a normal/reverse rotation by the rotation shaft A2, an end of the wire A1 may be wound to the bobbin A3 or unwound therefrom and it may be pulled or unwound for a binding operation.

The engaging and fixing unit 6 provides a configuration for generating a one-directional engaging and contacting force and controlling a rotation in the unwinding direction while the binding unit 4 is wound.

The engaging and fixing unit 6 includes an engaged groove B1 and an engaged protrusion B2, and is installed in the module housing 2 while facing the binding unit 4.

Particularly, the engaged groove B1 and the engaged protrusion B2 are of a ratchet gear type and are formed to generate a combination (contact) and a one-directional (unwinding directional) engaging and contacting force.

Figure 4:
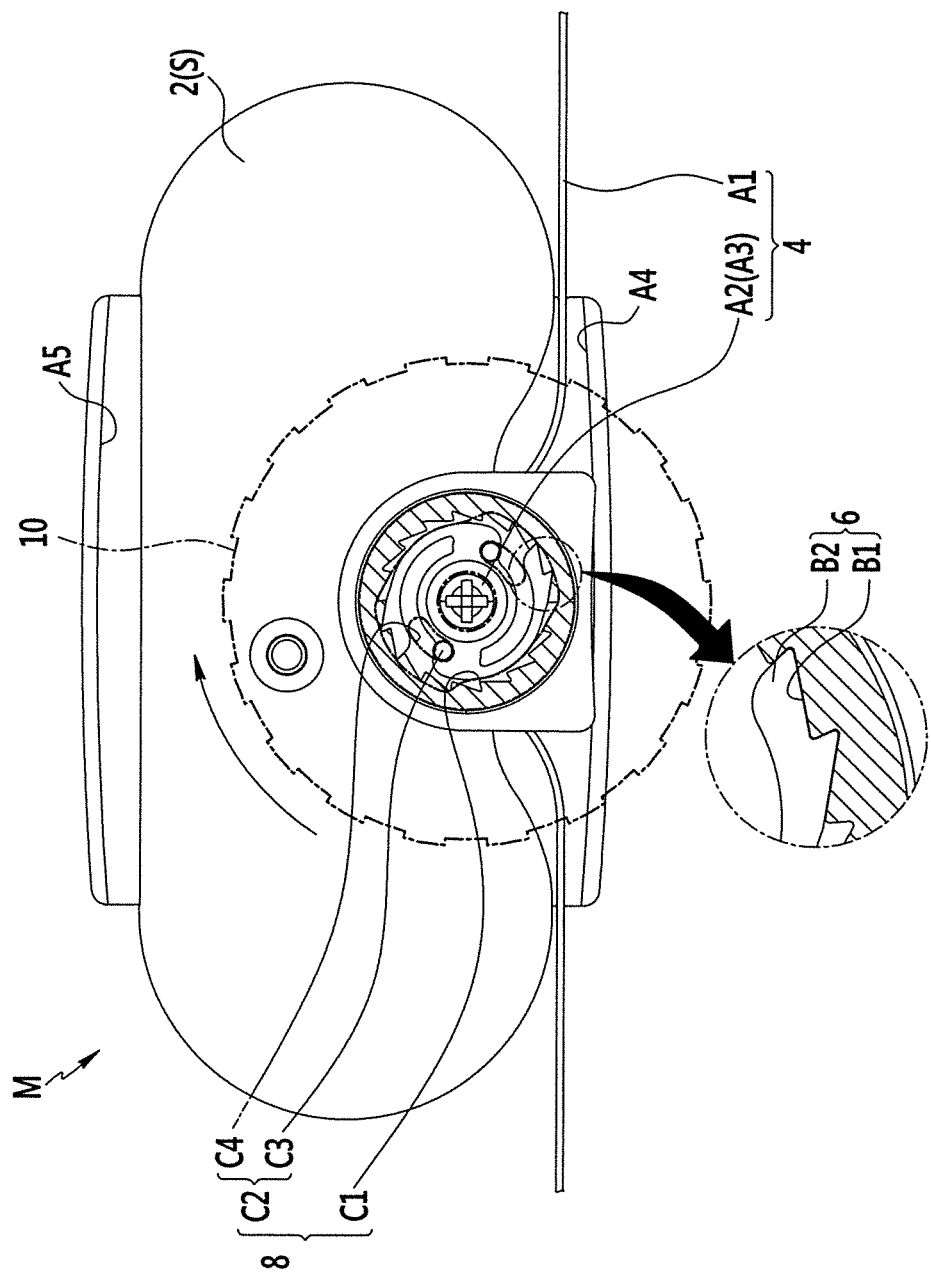

Referring to FIG. 3 and FIG. 4, the engaged groove B1 may be formed on the module housing 2 while forming a groove unit of a ring type and inscribed gear type forming a same shaft as the rotation shaft A2 of the binding unit 4.

The engaged protrusion B2 may be provided with a configuration of the protrusion unit that may be installed in the rotation shaft A2, rotated together with the rotation shaft A2, and combined to the engaged groove B1 in an inscribed gear form.

The engaged protrusion B2 may be configured with at least one protrusion, and as shown in FIG. 4, it may be formed to be protruded so that it may be flexibly engaged to the groove unit of the engaged groove B1.

That is, regarding the engaged groove B1 and the engaged protrusion B2, when the rotation shaft A2 of the binding unit 4 is rotated to wind the wire A1, the protrusion is operated to climb over the groove, and when the same is rotated to unwind it, the protrusion is formed to be flexibly engaged to the groove and generate a one-directional engaging and contacting force.

The engaging and fixing unit 6 may allow the rotation shaft A2 of the binding unit 4 to be rotated to be wound while a rotation for unwinding is controlled so that particularly when the wire A1 is wound to be available for a binding operation, the wire A1 may be easily locked while it is wound.

The rotation unit 8 is formed to operate the binding unit 4 in the winding and unwinding direction, and it is particularly formed to release the one-directional engaging and contacting state of the engaging and fixing unit 6 in connection with the unwinding operation.

The rotation unit 8 includes a release unit C1 for releasing the one-directional engaging and contacting state of the engaging and fixing unit 6, and a guide unit C2 for guiding an operation of the release unit C1, and it may be installed in a cap form for covering a top of the engaging and fixing unit 6 on the module housing 2.

For example, as shown in FIG. 2 and FIG. 3, the rotation unit 8 may be installed in the module housing 2 to allow normal/reverse rotations with respect to an axis line of the rotation shaft A2 while covering the groove unit and the protrusion unit of the engaging and fixing unit 6.

Figure 5:
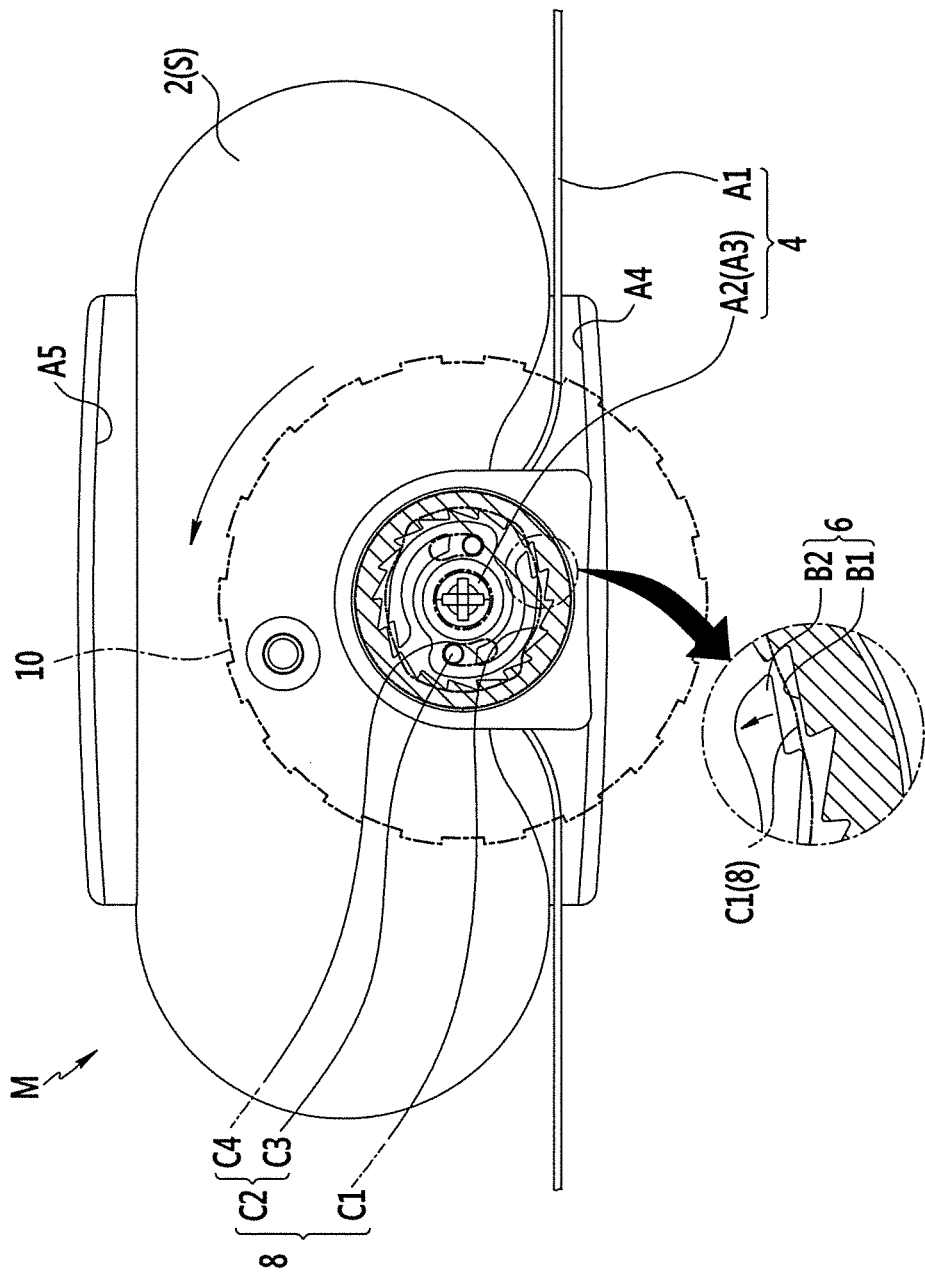

As shown in FIG. 5, the release unit C1 is formed, when the rotation unit 8 rotates to be unwound with respect to the axis line of the rotation shaft A2, to have a contact configuration in which the engaged protrusion B2 may push or press the protrusion unit with a contacting force so that the one-directional engaging and contacting state may be released from the engaged groove B1.

The guide unit C2 connects the rotation unit 8 to move the engaged protrusion B2 and rotate the rotation shaft A2, and particularly it is formed to have a connection and guide configuration for guiding the release operation of the release unit C1 during an unwinding operation of the rotation unit 8.

The guide unit C2 includes a guide protrusion C3 and a guide groove C4, and for example, as shown in FIG. 3, the guide protrusion C3 may be formed on the engaged protrusion B2, and the guide groove C4 may be formed on the rotation unit 8 while corresponding to the guide protrusion C3.

The rotation unit 8 may be connected to rotate the rotation shaft A2 in the normal/reverse direction through the engaged protrusion B2 by the guide unit C2.

Particularly, the guide groove C4 is formed to have a long groove form in which it may be operated without interference with the guide protrusion C3 of the engaged protrusion B2 within a predetermined rotation angle, and it may push the engaged protrusion B2 with a contact force of the release unit C1 to enable release of engagement when the rotation unit 8 is unwound.

That is, the guide groove C4 provides a rotation moving space for releasing the release unit C1 when the rotation unit 8 is rotated to be unwound.

According to the configuration of the rotation unit 8, the binding unit 4 may be operated to be wound or unwound by the rotating operation in the normal/reverse direction.

For example, when the rotation unit 8 is operated in the winding direction with reference to FIG. 4, the guide protrusion C3 of the guide unit C2 may contact a groove section of the guide groove C4, the engaged protrusion B2 of the engaging and fixing unit 6 may climb over the engaged groove B1, and the rotation shaft A2 may rotate to be wound.

As shown in FIG. 5, when the rotation unit 8 is operated in the unwinding direction, while the guide protrusion C3 of the guide unit C2 moves in the groove section of the guide groove C4, a one-directional engagement of the engaging and fixing unit 6 may release by the release unit C1, and the rotation shaft A2 may rotate to be unwound.

The device for attaching a sensor for a TPMS according to an exemplary embodiment of the present invention may further include an operation lever 10 corresponding to the rotation unit 8, as shown in FIG. 2.

The operation lever 10 is formed to have a lever configuration that may be installed in the rotation unit 8 in an attachable/detachable manner and may be operable in the normal/reverse rotation direction.

For example, the operation lever 10 may have a circular disk shape to be grabbed by a hand, and may be installed in a top of the rotation unit 8 in an attachable/detachable manner by inserting-combination of the protrusion and the groove.

The operation lever 10 may then be set to be connected to the rotation unit 8, and the rotation unit 8 may be more conveniently operated by rotating the operation lever 10 by hand so further improved operational convenience may be acquired.

The present invention may be formed to have a displaying configuration available for checking an appropriate rotating and tightening state in the case of such a rotating and tightening operation.

For example, although not shown in the drawing, a display unit in a character, symbolic, or uneven shape may be formed to the module housing 2 and the operation lever 10 with respect to the rotation unit 8. In the case of the rotating operation for binding, the appropriate rotating operational state may be easily checked through the display unit, thereby increasing the operational convenience and particularly preventing damage or deformation of the device in advance according to an excessive rotating operation.

Therefore, the present invention may install the module housing 2 in the vehicle wheel (W) or separate the same therefrom according to a binding fixing method using the wire A1.

Figure 6:
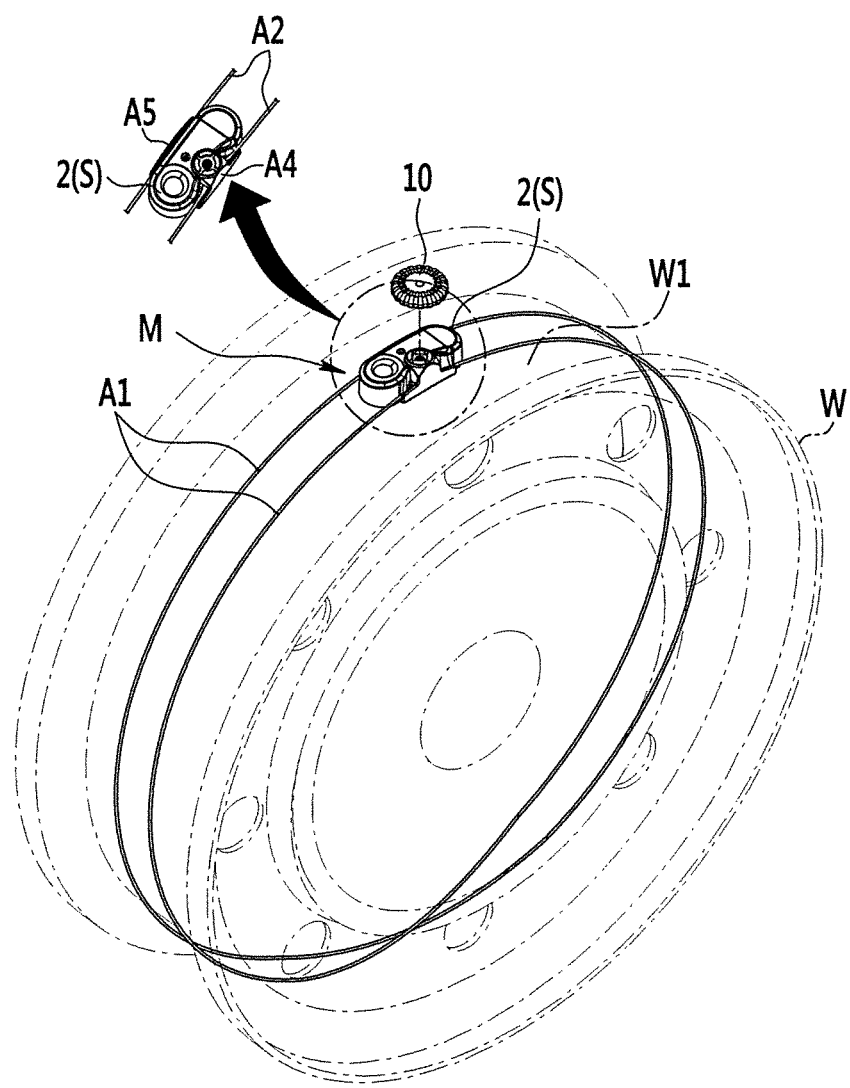

For example, as shown in FIG. 6, the wire A1 of the binding unit 4 drawn out to the drawing out unit A4 of the module housing 2 is set to be engaged to the support unit A5 and to be wound to wrap the circumference portion W1 of the wheel (W).

Figure 7:
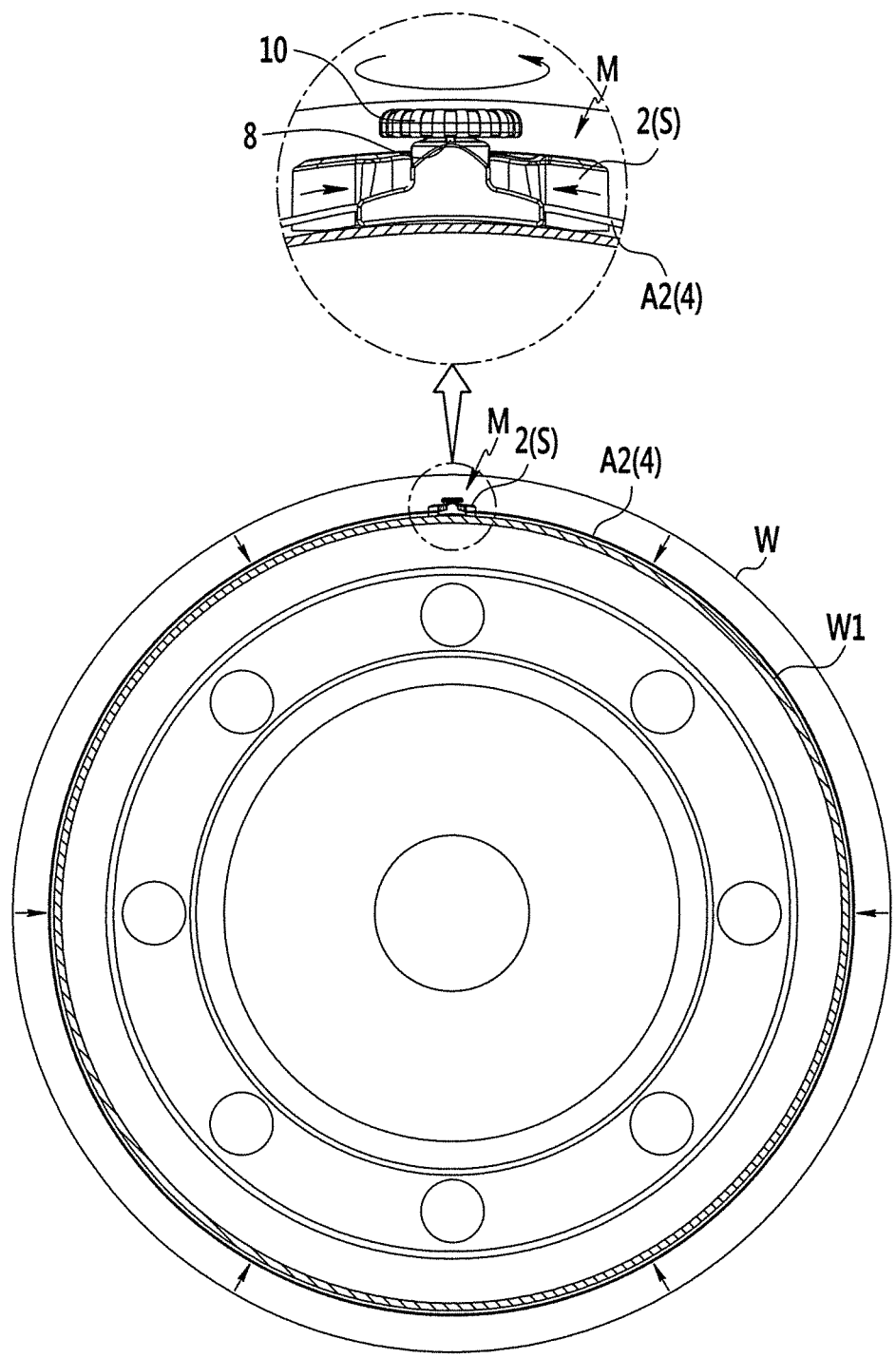

As shown in FIG. 7, when the rotation unit 8 is rotated to be wound by using the operation lever 10, the wire A2 of the binding unit 4 is operated to be pulled and wound to tighten the circumference portion W1 of the wheel (W).

In this instance, the binding unit 4 is wound while its rotation in the unwinding direction is limited by the operation of the engaging and fixing unit 6.

The wire A1 is locked while being wound, and the module housing 2 may be attached and installed in the circumference portion W1 of the wheel (W) while being fixed, by a tightening and bonding force of the wire A1.

When the module housing 2 is attached and installed with the tightening and bonding force for wrapping the entire circumference portion W1 of the wheel (W) with the wire A1, the stable attaching state may be maintained when the centrifugal force, huge impacts, or vibrations are generated particularly when the vehicle travels too fast or it runs on the irregular road surface.

Figure 8:
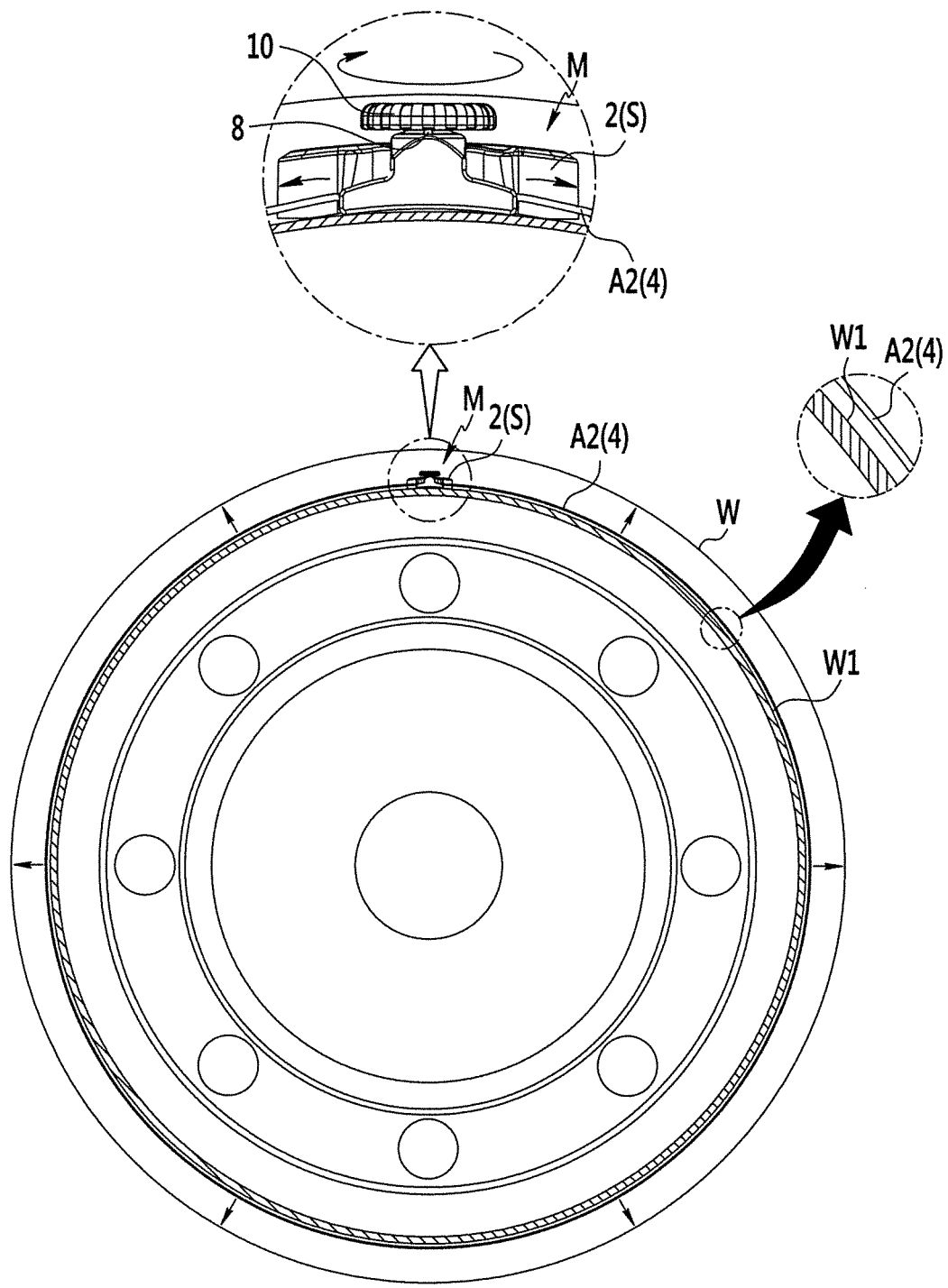

When attempting to separate the module housing 2 from the wheel (W), as shown in FIG. 8, the rotation unit 8 is rotated to be unwound by the operation lever 10 to unwind the binding unit 4.

In this instance, the one-directional engaging and contacting state of the engaging and fixing unit 6 is released by the release unit C1 and the guide unit C2 in connection with the unwinding operation of the rotation unit 8 as shown in FIG. 5, so the binding unit 4 may be operated as unwound.

As shown in FIG. 8, the tightening and bonding force of the wire A1 releases by the unwinding operation of the binding unit 4 so the module housing 2 may be separated from the wheel (W).

Therefore, the present invention may more easily and quickly install and separate the sensor module (S) according to the binding fixing method using the wire A1, and may also secure acceptable installation stability by the stable tightening and bonding force of the wire A1 functioning to wrap the entire circumference portion W1 of the wheel (W).

The invention claimed is:

1. A device for attaching a sensor for a tire pressure monitoring system (TPMS), comprising:
    a module housing including a sensor module for a TPMS;
    a binding unit including a wire that is long enough to be wrapped on a wheel circumference portion of a vehicle, and a rotation shaft installed in the module housing to wind or unwind the wire by a normal/reverse rotation;
    an engaging and fixing unit including an engaged groove and an engaged protrusion formed to generate an engaging and contacting force while being able to control an unwinding rotation corresponding to the rotation shaft of the binding unit; and
    a rotation unit disposed to rotate the rotation shaft of the binding unit and formed to release an engaging and contacting state of the engaging and fixing unit in connection with the rotating,
    wherein the rotation shaft of the binding unit includes a bobbin installed in the module housing, the bobbin configured to rotate while the wire is wound on or unwound from the bobbin by the normal/reverse rotation.

2. The device of claim 1, wherein
    the module housing includes a drawing out unit for allowing the wire of the binding unit to draw to an outside, and a support unit for engaging the drawn wire to enable a binding operation while the drawn wire wraps a wheel circumference portion of the vehicle.

3. The device of claim 1, wherein
at least one strand of the wire of the binding unit is connected and formed so as to be wound on or unwound from the rotation shaft.

4. The device of claim 3, wherein
the wire is connected and fixed to the rotation shaft by a pressing and contacting force of a fastener, and
the fastener uses a set screw.

5. The device of claim 1, wherein,
regarding the engaging and fixing unit,
the engaged groove is formed on the module housing while forming a groove unit in a ring type and inscribed gear type forming a same shaft as the rotation shaft of the binding unit, and
the engaged protrusion is formed while configuring a protrusion unit flexibly engaged to the engaged groove and generating a one-directional engaging and contacting force by a rotation operation while combined to a rotation shaft of the binding unit.

6. The device of claim 5, wherein,
regarding the engaged groove and the engaged protrusion,
when the rotation shaft is rotated to be wound, the protrusion unit is set to climb over the groove unit and generate a one-directional engaging and contacting force for being rotatable in winding the rotation shaft and being limited in the unwinding.

7. The device of claim 1, wherein
the rotation unit includes:
a release unit for releasing an engaging and contacting state of an engaged groove and an engaged protrusion of the engaging and fixing unit in connection with a rotating operation; and
a guide unit for guiding an operation of the release unit, and
the rotation unit is installed in the module housing to allow normal/reverse rotations with respect to an axis line of a rotation shaft of the binding unit.

8. The device of claim 7, wherein
the release unit is formed to generate a contacting force while an engaged protrusion moves so as to release the engagement on the engaged groove when the rotation unit is unwound with respect to an axis line of the rotation shaft.

9. The device of claim 7, wherein
the guide unit includes a guide protrusion and a guide groove that are inserted into each other and are combined so as to generate a connection state for rotating the engaged protrusion while the release unit is available for an operation when the rotation unit is operated.

10. The device of claim 9, wherein
the guide groove is formed to be extended in a long groove form so that the release unit may perform a release operation without interference with the guide protrusion within a predetermined rotation angle when the rotation unit is unwound.

11. The device of claim 1, wherein
the sensor attaching device for a TPMS further includes an operation lever corresponding to the rotation unit, and
the operation lever is formed to be attachable/detachable to/from the rotation unit according to insertion and combination and is formed to rotate the rotation unit in a normal/reverse rotation direction.

12. A device for attaching a sensor for a tire pressure monitoring system (TPMS), comprising:

a module housing including a sensor module for a TPMS;
a binding unit including a wire that is long enough to be wrapped on a wheel circumference portion of a vehicle, and a rotation shaft installed in the module housing to wind or unwind the wire by a normal/reverse rotation;
an engaging and fixing unit including an engaged groove and an engaged protrusion formed to generate an engaging and contacting force while being able to control an unwinding rotation corresponding to the rotation shaft of the binding unit; and
a rotation unit disposed to rotate the rotation shaft of the binding unit and formed to release an engaging and contacting state of the engaging and fixing unit in connection with the rotating,
wherein the module housing includes a drawing out unit for allowing the wire of the binding unit to draw to an outside, and a support unit for engaging the drawn wire to enable a binding operation while the drawn wire wraps a wheel circumference portion of the vehicle.

13. The device of claim 12, wherein
at least one strand of the wire of the binding unit is connected and formed so as to be wound on or unwound from the rotation shaft.

14. The device of claim 13, wherein
the wire is connected and fixed to the rotation shaft by a pressing and contacting force of a fastener, and
the fastener uses a set screw.

15. The device of claim 12, wherein
the sensor attaching device for a TPMS further includes an operation lever corresponding to the rotation unit, and
the operation lever is formed to be attachable/detachable to/from the rotation unit according to insertion and combination and is formed to rotate the rotation unit in a normal/reverse rotation direction.

16. A device for attaching a sensor for a tire pressure monitoring system (TPMS), comprising:
a module housing including a sensor module for a TPMS;
a binding unit including a wire that is long enough to be wrapped on a wheel circumference portion of a vehicle, and a rotation shaft installed in the module housing to wind or unwind the wire by a normal/reverse rotation;
an engaging and fixing unit including an engaged groove and an engaged protrusion formed to generate an engaging and contacting force while being able to control an unwinding rotation corresponding to the rotation shaft of the binding unit; and
a rotation unit disposed to rotate the rotation shaft of the binding unit and formed to release an engaging and contacting state of the engaging and fixing unit in connection with the rotating,
wherein, regarding the engaging and fixing unit,
the engaged groove is formed on the module housing while forming a groove unit in a ring type and inscribed gear type forming a same shaft as the rotation shaft of the binding unit, and
the engaged protrusion is formed while configuring a protrusion unit flexibly engaged to the engaged groove and generating a one-directional engaging and contacting force by a rotation operation while combined to a rotation shaft of the binding unit.

17. The device of claim 16, wherein,
regarding the engaged groove and the engaged protrusion,
when the rotation shaft is rotated to be wound, the protrusion unit is set to climb over the groove unit and generate a one-directional engaging and contacting force for being rotatable in winding the rotation shaft and being limited in the unwinding.

18. The device of claim 16, wherein
the sensor attaching device for a TPMS further includes
an operation lever corresponding to the rotation unit, and
the operation lever is formed to be attachable/detachable
to/from the rotation unit according to insertion and
combination and is formed to rotate the rotation unit in
a normal/reverse rotation direction.

* * * * *